United States Patent
Thiex et al.

(10) Patent No.: US 9,260,038 B2
(45) Date of Patent: Feb. 16, 2016

(54) FLOOR LOCK FOR A MOTOR VEHICLE SEAT

(75) Inventors: Andreas Thiex, Heilbach (DE); Michael Kaiser, Wuppertal (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 14/233,718

(22) PCT Filed: Jul. 5, 2012

(86) PCT No.: PCT/EP2012/063148
§ 371 (c)(1),
(2), (4) Date: May 13, 2014

(87) PCT Pub. No.: WO2013/010807
PCT Pub. Date: Jan. 24, 2013

(65) Prior Publication Data
US 2014/0239661 A1    Aug. 28, 2014

(30) Foreign Application Priority Data
Jul. 19, 2011   (DE) .......................... 10 2011 051 940

(51) Int. Cl.
*B60N 2/10*   (2006.01)
*B60N 2/015*  (2006.01)

(52) U.S. Cl.
CPC .................................. *B60N 2/01583* (2013.01)

(58) Field of Classification Search
CPC ...... B60N 2/12; B60N 2/206; B60N 2/01583; B60N 2/5825; B60N 2/686; E05B 83/16; E05B 83/34; E05B 85/26; E05C 3/24
USPC .................. 297/378.12, 341, 378.14, 452.18, 297/452.38; 296/65.03, 428
See application file for complete search history.

(56) References Cited

U.S. PATENT DOCUMENTS 5,730,480 A * 3/1998 Takamura .................. 248/503.1
(Continued)

FOREIGN PATENT DOCUMENTS

| DE | 44 39 644 A1  | 6/1995 |
| DE | 199 02 561 A1 | 8/2000 |
| DE | 103 04 574 A1 | 8/2004 |
| DE | 103 05 177 A1 | 8/2004 |

(Continued)

OTHER PUBLICATIONS

International Search Report mailed Sep. 20, 2012, as received in corresponding International Patent Application No. PCT/EP2012/063148.

*Primary Examiner* — Glenn Dayoan
*Assistant Examiner* — Sunsurraye Westbrook
(74) *Attorney, Agent, or Firm* — Foley & Lardner LLP

(57) ABSTRACT

A floor lock for a motor vehicle seat for detachably connecting the motor vehicle seat to the vehicle floor, has a locking pawl adjustable between a locked position and an unlocked position and a control pawl, which fixes the position of the locking pawl, is in operative connection with the locking pawl and is adjustable relative to the latter between a closed position and an open position. The locked position of the locking pawl is secured by a securing pawl arranged in a secured position, the securing pawl being in operative connection with the locking pawl and being adjustable by the latter between the secured position and a release position.

16 Claims, 6 Drawing Sheets

(56) References Cited

U.S. PATENT DOCUMENTS

Figure 1:
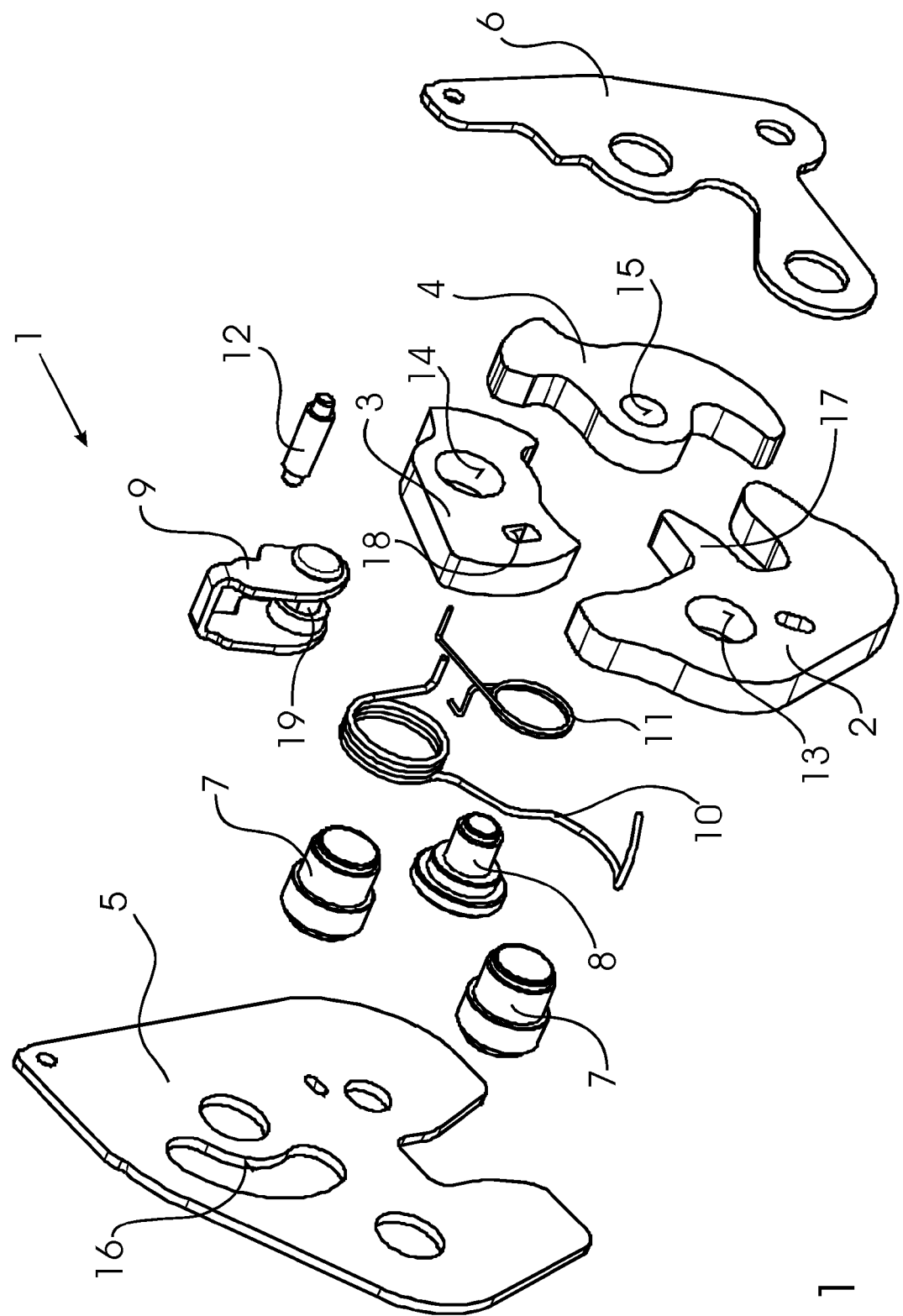

| | | | |
|---|---|---|---|
| 6,123,379 A * | 9/2000 | Yamada et al. | 296/65.03 |
| 7,264,293 B2 * | 9/2007 | Fischer et al. | 296/65.03 |
| 7,575,280 B2 * | 8/2009 | Palomba et al. | 297/336 |
| 7,762,605 B2 * | 7/2010 | Otsuka et al. | 296/65.03 |
| 8,029,030 B2 * | 10/2011 | Shimura et al. | 292/216 |
| 8,226,169 B2 * | 7/2012 | Kreuels et al. | 297/378.13 |

FOREIGN PATENT DOCUMENTS

| | | |
|---|---|---|
| DE | 10 2005 023 861 A1 | 2/2006 |
| DE | 11 2006 002 651 T5 | 8/2008 |
| DE | 10 2007 016 409 A1 | 10/2008 |
| EP | 1 608 528 A2 | 12/2005 |
| EP | 2 130 716 A1 | 12/2009 |
| GB | 2 461 631 A | 1/2010 |
| WO | WO-2004/069585 A1 | 8/2004 |

* cited by examiner

FLOOR LOCK FOR A MOTOR VEHICLE SEAT

CROSS REFERENCE TO RELATED APPLICATIONS

The present application is a U.S. National Stage of International Application No. PCT/EP2012/063148, filed Jul. 5, 2012, which claims the benefit of German Patent Application No. 10 2011 051 940.8, filed Jul. 19, 2011, the entire disclosures of all of which are incorporated herein by reference.

The invention relates to a floor lock for a motor vehicle seat for detachably connecting the motor vehicle seat to a vehicle floor, with
- a locking pawl adjustable between a locked position and an unlocked position and
- a control pawl which fixes the position of the locking pawl, is in operative connection with the locking pawl and is adjustable relative to the latter between a closed position and an open position.

Locks of the type initially mentioned are used particularly in large-capacity passenger vehicles or vans to increase the flexibility of these vehicles. The motor vehicle seats usable for these vehicles, which are equipped with a generic floor lock, enable simple installation and removal of at least the motor vehicle seats situated in the back area of the vehicle, so the vehicle can be adapted easily for the intended use. In cases where there is a need for greater loading volume, the vehicle seats are removed, and for carrying a greater number of people, the seats can be arranged in the vehicle again. The generic floor locks work in this respect together with locking elements fix-mounted in the vehicle, such as locking bars, on which the floor locks are locked in place in their closed position and thus determine the position of the motor vehicle seat.

It is essential for passenger safety that the floor locks situated on the motor vehicle seats which serve to connect the motor vehicle seat with the vehicle ensure a reliable connection of the motor vehicle seat to the vehicle despite enabling simple installation and removal in the vehicle; even under crash conditions, it must be ensured that the vehicle seat does not leave its set position due to the increased forces.

It is the object of the invention to provide a floor lock of the type initially mentioned, which facilitates convenient installation and removal of a vehicle seat connected with the floor lock, but at the same time ensures highly secure positioning of the motor vehicle seat in the vehicle. The invention solves the object with a floor lock having the features of claim 1.

Advantageous further developments of the invention are specified in the dependent claims.

It is characteristic of the inventive floor lock that the locked position of the locking pawl, in which said pawl acts in its installed position in the vehicle together with a locking element provided in the vehicle for engagement with the floor lock, is secured by a securing pawl arranged in a secured position in which the securing pawl is in operative connection with the control pawl and is adjustable using the latter between the secured position and a release position. It is important for the inventive floor lock that the locking pawl provided for moving the locking pawl between its locked position and unlocked position is also used for moving the securing pawl, which itself secures the position of the locking pawl in the locked position and thus effectively prevents a separation of the connection between the floor lock and the motor vehicle. Control of the movement of the securing pawl by the control pawl also provided to control the movement of the locking pawl ensures error-free co-action of the locking pawl and securing pawl in a particularly reliable way in this. False positioning of the securing pawl with respect to the locking pawl can be effectively avoided by the inventive embodiment of the floor lock. Furthermore, the position of the locking pawl in the unlocked position is reliably secured by the securing pawl, with sufficiently high resistance offered to the increased forces occurring in the case of a crash as well.

An adjustment of the securing pawl from its secured position to its release position which releases the locking pawl and/or of the locking pawl from its locked position to its unlocked position can fundamentally occur in any manner. Likewise the choice of embodiment for the adjusting movement of the pawls with respect to one another is fundamentally open, with preference for the pawls arranged in a manner able to be swiveled to each other. According to a particularly advantageous embodiment of the invention, the securing pawl is pretension in the direction of its release position and/or the locking pawl is pretensioned in the direction of its unlocked position. According to this extension of the invention, the securing pawl and/or the locking pawl attempt to assume their release position or unlocked position due to their pretension. However, a corresponding movement of the locking pawl and/or securing pawl is prevented by the control pawl in operative connection with the locking pawl and the securing pawl, because according to the invention, the position of the locking pawl and securing pawl is determinable by the position of the control pawl. However, the advantageously provided pretension of the securing pawl and/or locking pawl makes it possible to forgo an additional gear for the securing pawl and/or locking pawl if a movement of the locking and/or securing pawl is enabled by the position of the control pawl. A floor lock embodied in this manner thus has a particularly simple and compact construction and high functional reliability.

According to a further embodiment of the invention, it is provided that the control pawl be pretensioned in the direction of its closed position. The locked position of the locking pawl and the secured position of the securing pawl are associated with the closed position of the control pawl. The advantageously provided pretension of the control pawl in the direction of the closed position has the result that, in its un-tensioned state, the control pawl arranges the locking pawl and the securing pawl automatically in their locked and secured positions respectively. Thus this embodiment of the invention can prevent a movement of the locking and securing pawls in the direction of their unlocked position and release position respectively in a particularly reliable manner. A release of the floor lock requires that the control pawl first be moved against the pretension acting on the control pawl.

In the case of a concurrent pretensioning of the securing pawl in the direction of its release position, the locking pawl in the direction of its unlocked position and the control pawl in the direction of its closed position, according to a particularly advantageous development of the invention, it is provided that the pretension acting on the control pawl is greater than the pretension acting on the securing pawl and/or locking pawl. For one, this embodiment of the invention ensures that in the case of a movement of the control pawl in the direction of its open position, the securing pawl and locking pawl in operative connection with the control pawl and the locking pawl are moved automatically in the direction of their unlocked position and release position due to the spring pretension present. At the same time, the spring pretension of the control pawl ensures that in the untensioned state it pretensions the floor lock in the direction of the locked position of the locking pawl so that unintended opening of the floor lock is effectively counteracted. Due to the higher pretension force of the control pawl with respect to the pretensioning of the securing pawl and locking pawl, unintended movement of the locking and securing pawl in the direction of their unlocked position and release position is effectively prevented despite the pretensioning of the securing and locking pawl. Here it is particularly advantageous that the pretension force acting on the control pawl is greater than the sum of the pretension forces acting on the locking pawl and securing pawl if these are both pretensioned.

The choice of embodiment for the operative connection of the control pawl with the locking pawl and/or securing pawl is fundamentally open. However, in the case of the usual resulting use of pawls which are arranged pivotable to each other, according to a particularly advantageous embodiment it is envisaged that the control pawl in its closed position touches surfaces of the securing pawl and the locking pawl facing each other. According to this embodiment of the invention, the control pawl for moving the locking and securing pawl touches both the locking pawl and the securing pawl. In the case of the pivotable arrangement of the pawls provided for this embodiment, in which these are borne hinged on axes running parallel to each other, the arrangement of the locking pawl and the securing pawl occurs in such a way that these must execute opposed pivoting movements to open the floor lock. A control pawl thus able to be arranged in the pivoting range of the securing pawl and locking pawl is particularly suited for blocking the opening movements of these pawls. The contact surfaces of the locking pawl and securing pawl are facing each other here so that the control pawl is situated between the surfaces facing each other, and these surfaces move toward one another during an opening movement.

Surface contact of the control pawl with both the securing pawl and the locking pawl ensures high functional reliability, because movements of the control pawl are implemented directly in corresponding movements of the securing and locking pawl, with the course of movement determinable by the contour of the surfaces in contact with each other. Furthermore, the arrangement of the control pawl between the securing pawl and the locking pawl provided according to this advantageous embodiment of the invention ensures very good control of the locking pawl and securing pawl, which can prevent unintended opening of the floor lock with particular effectiveness.

Position fixation of the securing and/or locking pawl can fundamentally occur in any manner, with the arrangement of the control pawl in the area between two surfaces of the securing pawl and locking pawl facing each other, which is provided according to an advantageous embodiment of the invention, already serving to fix position. According to a particularly advantageous embodiment of the invention, it is envisaged that the touching surfaces of the control pawl and the securing pawl and/or the control pawl and the locking pawl in the closed position of the control pawl are formed in such a way that self-locking occurs between the touching surfaces, which inhibits independent movement of the securing pawl in the direction of its release position and/or of the locking pawl in the direction of its unlocked position. According to this embodiment of the invention, the arrangement of the touching surfaces of the control pawl and locking pawl and/or control pawl and securing pawl blocks an unintended movement of the locking pawl and/or securing pawl due to the self-locking configured, so that unintended opening of the floor lock can be prevented in a particularly effective and simple manner. Additional securing measures for fixing the position of the securing pawl and/or locking pawl can be omitted with this embodiment of the invention, so the floor lock can be manufactured particularly easily and cost-effectively.

It is important for the function of the floor lock that it be reliably secured in its locked position. For the function of secure locking of the floor lock, it is basically of no concern to what extent the position of the locking pawl, securing pawl and/or control pawl can be determined in the case of an open floor lock. According to a particularly advantageous embodiment of the invention, however, it is envisaged that the control pawl in its open position is situated in such a way on the locking pawl arranged in the unlocked position and/or the securing pawl arranged in the release position that the locking pawl is blocked against movement in the direction of its locked position and/or the securing pawl is blocked against movement in the direction of its secured position. According to this embodiment of the invention, a floor lock constructed in this way offers the possibility to lock the locking pawl and/or the securing pawl in its release position or unlocked position so that a motor vehicle seat equipped with such a floor lock can be removed in a particularly simple and convenient manner after determining this position, without the need for continuous actuation of the floor lock. The control pawl can be used to set the locking pawl and/or securing pawl here; it is also suited for limiting the opening movement of the locking pawl and the securing pawl so that incorrect uses and damage to the motor vehicle by the pawls protruding to a significant extent from the floor lock can be prevented with particular effectiveness.

To lock a motor vehicle seat equipped with the inventive floor lock, it is necessary to close the floor lock in the installed position in the motor vehicle, in which the locking pawl is engaged with a locking element on the motor vehicle. A movement of the locking pawl in the direction of the closed position can occur here in basically any way, for example by manual actuation of the control pawl for the case that the vehicle user recognizes a correct positioning of the floor lock with respect to the locking element.

According to a particularly advantageous embodiment of the invention, however, it is provided that the locking pawl has an actuating element which can be brought into engagement with a locking element, the actuating element being situated in such a way that a movement of the locking pawl which is in the open position in the direction of the locking element causes a movement of the locking pawl in the direction of the closed position. According to this embodiment of the invention, there is an actuating element situated on the locking pawl, which, upon movement of a motor vehicle seat equipped with such a developed floor lock in the direction of its installed position, engages with the locking element provided on the motor vehicle for connecting with the floor lock and in the process moves the locking pawl into the locked position if the positioning is correct. A corresponding embodiment of the invention in which, for example, a projection can be situated on the locking pawl, said projection able to engage with the locking element, ensures that a movement of the locking pawl occurs only if it is in the required position with respect to the locking element for attachment on the vehicle. This embodiment of the invention is particularly effective for avoiding incorrect operation of the floor lock. Furthermore, it is also ensured here based on the operative connection provided by the invention between the locking pawl, control pawl and securing pawl that the securing pawl can also be found in the secured position associated with the locked position of the locking pawl due to the movement caused by the actuating element.

It is important for the function of the inventive floor lock that it be reliably situated on the locking element arranged on the vehicle in the locked position of the locking pawl. The locking element is fixed relative to the floor lock as much as possible in the locked position of the locking pawl of the floor lock. According to a particularly advantageous embodiment of the invention, it is provided for this that in the locked position, the locking pawl encompasses the locking element situated in a recessed section of a housing in such a way that the locking element is framed by the locking pawl and the housing. According to this embodiment of the invention, the floor lock has a housing which, together with the locking pawl, completely frames the locking element in the locked position of the locking pawl, so that a separation of the connection between the floor lock and the locking element is prevented with particular reliability. Movements of the locking element relative to the floor lock are limited either by surfaces of the locking pawl or of the housing.

Basically, the floor lock can be designed in such a way that in the locked position of the locking pawl there is sufficiently dimensioned space between said pawl and the housing to compensate tolerances of the locking element with respect to the floor lock. According to a particularly advantageous embodiment of the invention, however, it is provided that the locking pawl is adjustable via a partial area—nonetheless framing the locking element with the housing in doing so—to compensate position tolerances with respect to the locking element from the locked position in the direction of the unlocked position, with the contact areas of the locking pawl and the control pawl formed in such a way that independent movement of the locking pawl from a position within the partial area in the direction of the unlocked position is blocked by self-locking.

According to this embodiment of the invention it is provided that the locking pawl is adjustable to compensate tolerances with respect to the locking element in the direction of the unlocked position in a partial area, with the locking pawl framing the locking element together with the housing in the partial area as before, starting from the locked position, so that reliable positioning of the floor lock is ensured with respect to the locking element. Here the contact surfaces of the locking pawl and control pawl are designed in such a way that, in the case of a locking pawl moved in the direction of the unlocked position as well, the position then assumed within the partial area is blocked by self-locking due to an arrangement of the surfaces of the locking pawl and control pawl, so that a movement of the locking pawl out of a position within the partial area is prevented and no unintended opening movement results.

The co-action of the securing pawl and locking pawl in the secured position of the securing pawl is fundamentally open to choice. However, according to a particularly advantageous embodiment of the invention, it is envisaged that the securing pawl at least partially encompass the hook-shaped locking pawl on the outer side. This embodiment of the invention achieves a fixing of the locking pawl position by the securing pawl in a particularly simple manner. An opening movement of the locking pawl in the direction of its unlocked position is prevented with particular effectiveness by the securing pawl encompassing the locking pawl at least partially on the outer side. Thus a movement of the locking pawl is only possible after the securing pawl is removed from the adjustment range of the locking pawl.

According to a particularly advantageous embodiment of the invention, it is provided here that the contact surfaces of the locking pawl and securing pawl touching in the crash position are spaced apart in the locked position of the locking pawl. This embodiment of the invention can avoid noise which may result from contact of the surfaces with particular effectiveness. Furthermore, it is ensured that nonetheless in the case of a crash the securing pawl blocks a movement of the locking pawl in the direction of the unlocked position, so even in case of a crash a particularly reliable positioning of a motor vehicle seat provided with the floor lock is ensured on the vehicle floor.

Basically, any means can be used for actuating the control pawl. According to a particularly advantageous embodiment of the invention, however, the control pawl is connected with an attachment element, in particular a fastening clip for arranging a pull strap. According to this embodiment of the invention, particularly simple operation of the floor lock can be achieved in which for this the pull strap is simply led out of the floor lock and can be grasped in a simple manner by the user.

Figure 2:
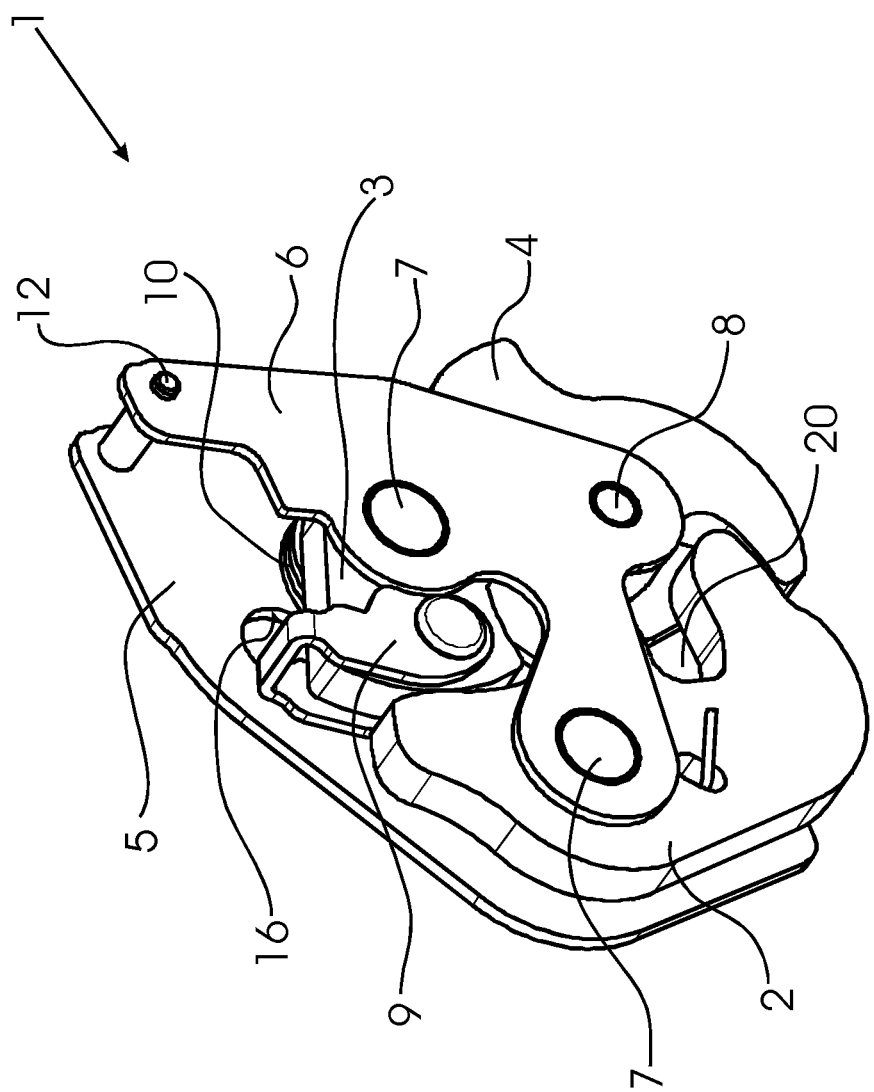
Figure 3:
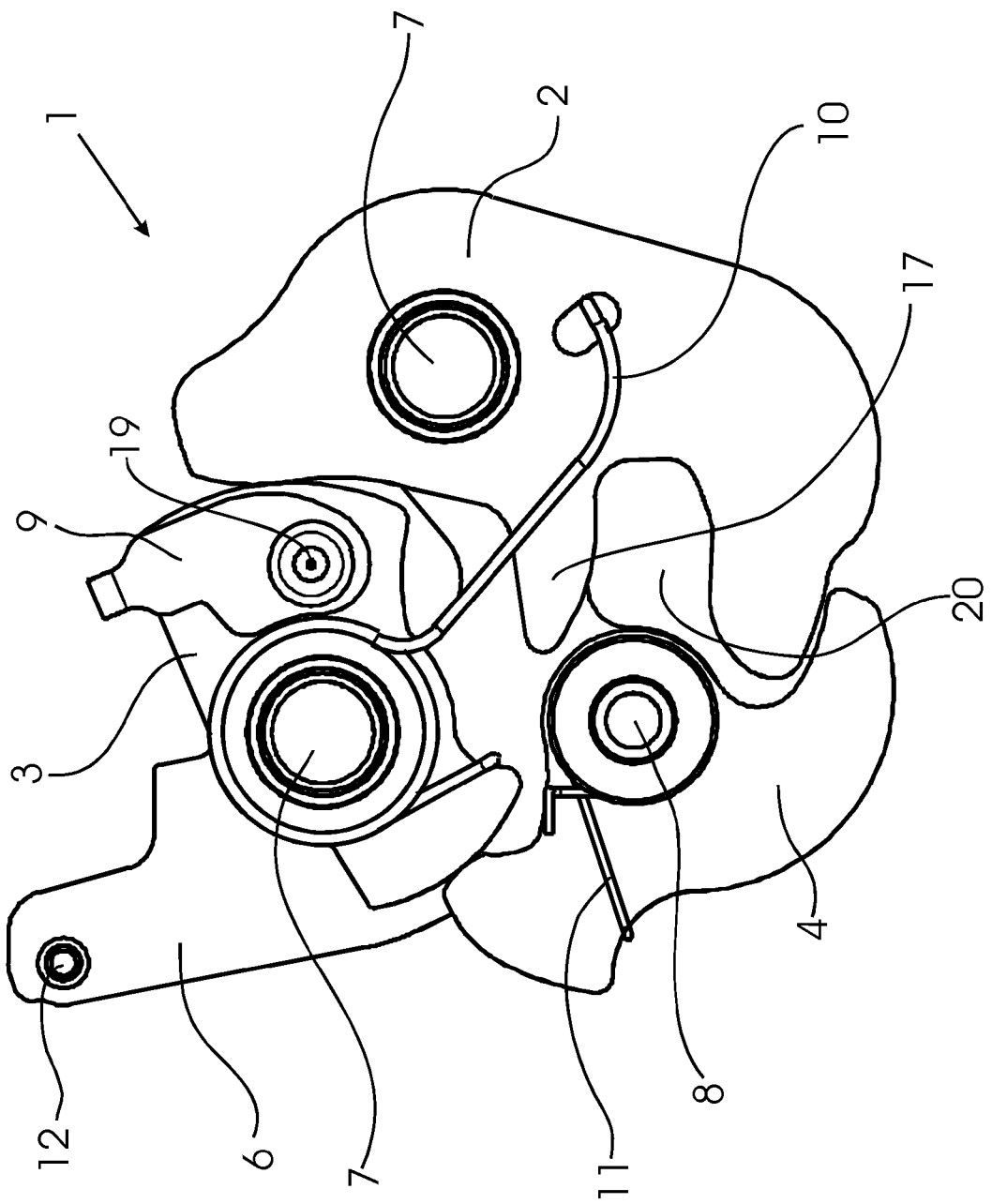
Figure 4:
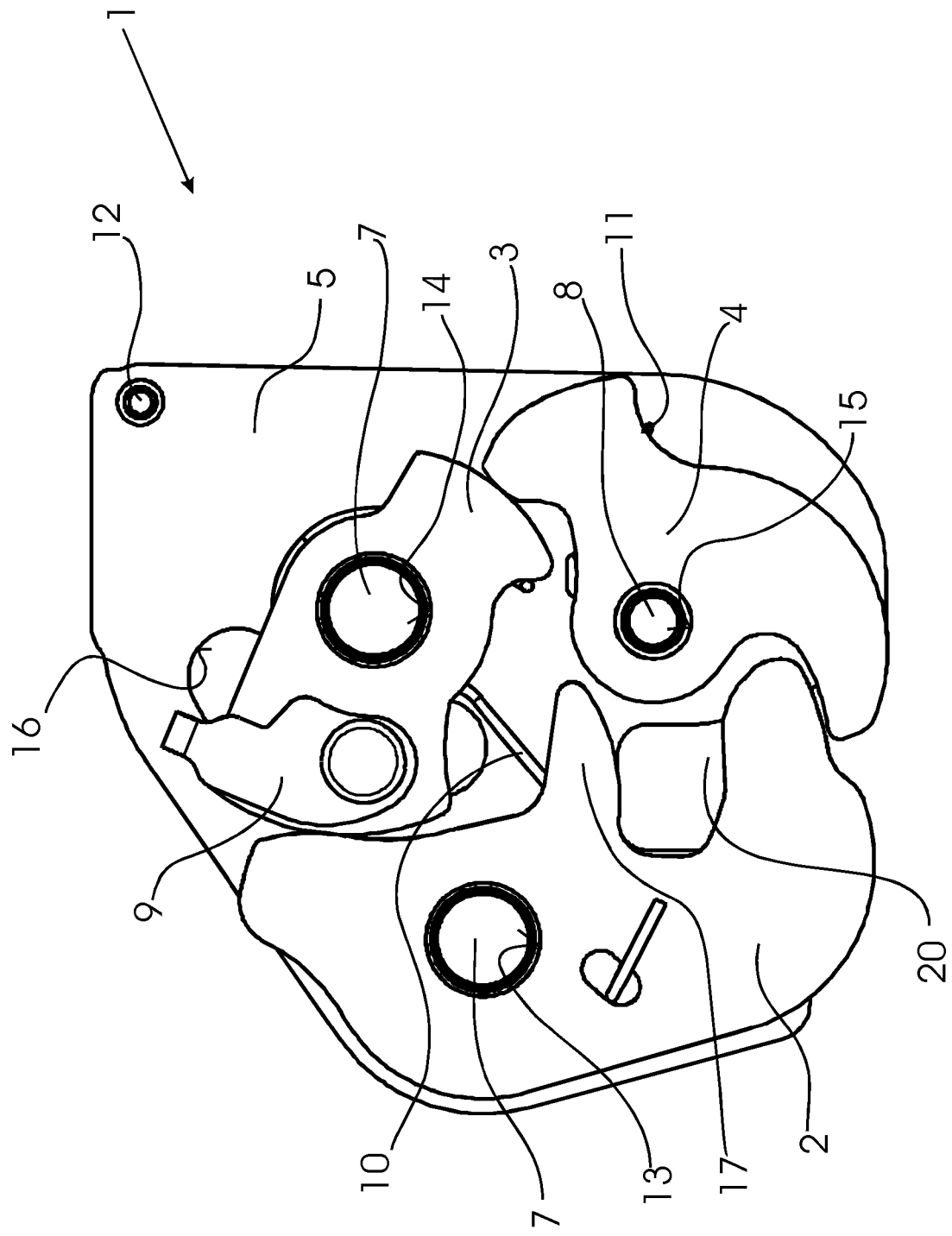
Figure 5:
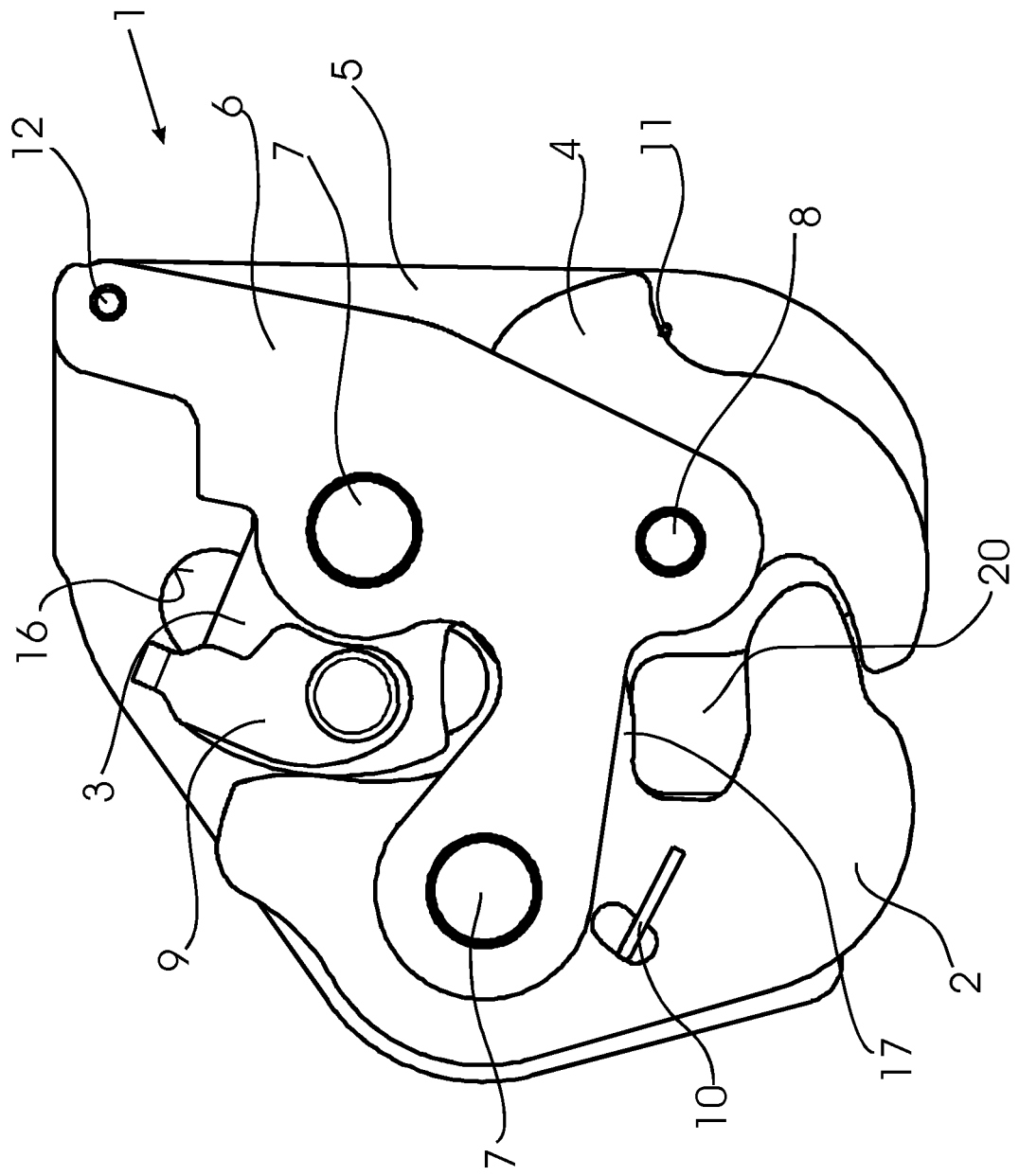

An embodiment of the invention is explained below with reference to the drawings. The drawings show in:

FIG. 1 an exploded view of a floor lock;

FIG. 2 a perspective view of a front side of the floor lock of FIG. 1;

FIG. 3 a rear view of the floor lock of FIG. 1 without depicting a housing base body;

FIG. 4 a front view of the floor lock of FIG. 1 without depicting a cover plate;

FIG. 5 a front view of the floor lock of FIG. 1; and

Figure 6:
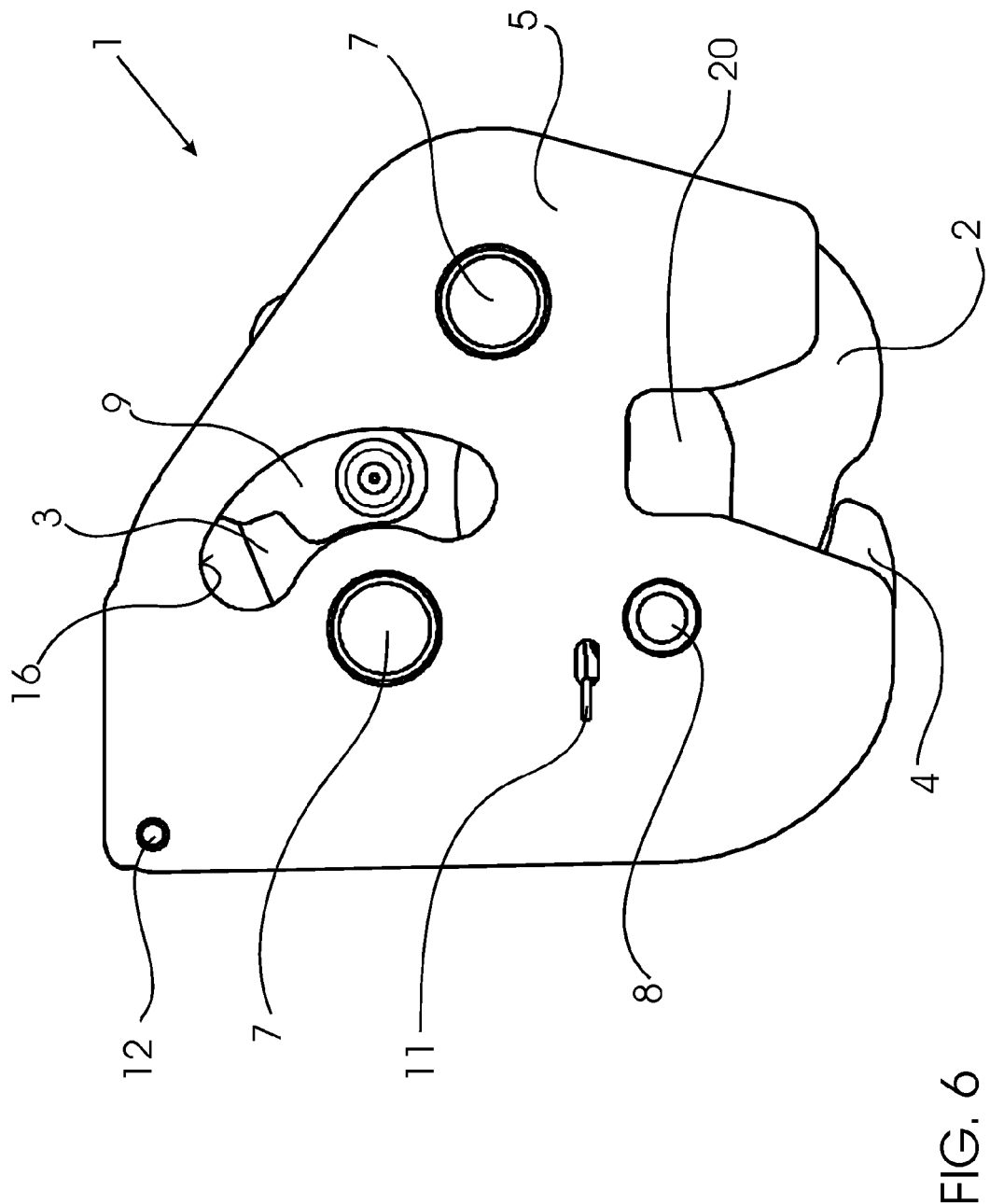

FIG. 6 a rear view of the floor lock of FIG. 1.

FIG. 1 depicts an exploded view of a floor lock 1 provided on a motor vehicle seat not shown here; the motor vehicle seat can be mounted in the vehicle with said lock. The key functional components of the floor lock 1 are a locking pawl 2, a control pawl 3 and a securing pawl 4. These pawls 2, 3, 4 are borne hinged on a housing base body 5, with hinge pins 7, 8 provided for this on the housing base body 5, which extend through drilled holes 13, 14, 15 of the pawls 2, 3, 4.

In the assembled position of the floor lock 1, a cover plate 6 covers the pawls 2, 3, 4 situated on the housing base body 5 and thus secures their position on the housing base body 5, with the spacing of the cover plate 6 with respect to the housing base body 5 determined by a distance pin 12 situated between the housing base body 5 and the cover plate 6, which furthermore can also be used for redirecting a pull strap not shown here, with which a user can make an adjustment of the floor lock 1.

A fastening clip 9 is situated on the control pawl 3 for operating the floor lock 1 using a pull strap; the pull strap can be attached to said clip. There is a bolt 19 for arranging the fastening clip 9 which extends through an attachment hole on the fastening clip 9 as well as through a hole 18 in the control pawl 3.

In the assembled position of the floor lock 1, a leg spring 10 is used to pretension the locking pawl 2 and the control pawl 3, with the control pawl 3 pretensioned in the direction of the closed position of the floor lock 1 shown in FIGS. 2 to 6, whereas the locking pawl 3 is pretensioned in the direction of its open position. The leg spring 10 is situated for this with its coil section coaxial to the bearing bolt 7 providing hinged support for the control pawl 3, with the first leg of the leg spring 10 in a hole of the locking pawl 2 and the second leg of the leg spring 10 touching the control pawl 3.

A further leg spring 11 with its first leg situated on the housing base body 5 and the opposing second leg on a back side of the securing pawl 4 is used to pretension the securing pawl 4 in the direction of the release position corresponding to the open position of the floor lock 1. The securing pawl 4 and the locking pawl 3 touch opposite surfaces of the control pawl 2 with their surfaces facing one another due to the pretension forces from the leg springs 10, 11.

In the closed position of the floor lock 1 shown in FIGS. 2 to 5, the locking pawl 2 and the securing pawl 4 touch opposite surfaces of the control pawl 3 with contact surfaces facing each other. The locking pawl 2 forms a closed, recessed section 20 together with a section of the housing base body 5, which is used to receive a locking element not shown here. In the closed position of the floor lock 1, the floor lock 1 thus ensures secure positioning of a motor vehicle seat connected with the floor lock 1, because the locking element cannot escape from the recessed section 20. The securing pawl 4, which engages behind the locking pawl 2 in its locked position, additionally secures the closed position of the floor lock 1 and reliably prevents that an opening of the floor lock 1 does not occur in the case of a crash despite the increased forces then between the locking pawl 2 and the locking element. Here the position of the securing pawl 4 and the locking pawl 2 assumed in the closed position 1 is secured by self-locking between the contact areas of these pawls 2, 4 with the control pawl 3.

To open the floor lock 1 it is necessary to move the control pawl 3 in the direction of the distance pin 12—clockwise with reference to the representation in FIGS. 2, 4 and 5. Then an opposite pivoting movement of the locking pawl 2 and the securing pawl 4 occurs due to the resultant spacing changes between the contact surfaces of the locking pawl 2 and the securing pawl 4 due to the contour of the control pawl 3, so that the recessed section 20 becomes accessible from the outside. A locking element situated within the recessed section 20 can then be moved out of the floor lock 1 or into the floor lock 1.

The opening movement of the locking pawl 2 and the securing pawl 4 is limited in this by the adjusting movement of the control pawl 3.

To arrange the floor lock 1 on the motor vehicle, the floor lock 1 is in the open state, and the locking element must then be moved into the recessed section 20. In the open position of the floor lock 1, the locking pawl 2 is in an unlocked position in which an actuating element 17 of the locking pawl 2 extends into the recessed section 20. A movement of the floor lock 1 in the direction of the locking element causes the actuating element 17 to engage with the locking element. A further movement of the floor lock 1 in the direction of the actuating element results in a pivoting movement of the locking pawl 2 in the direction of its locked position. Then due to the operative connection existing via the control pawl 3, a movement of the securing pawl 4 also occurs in the direction of its secured position until the locking element is completely framed in the recessed section 20.

To compensate position tolerances between the locking element and the floor lock 1, the recessed section 20 is overdimensioned. Moreover, the locking pawl 2 is adjustable in the direction of the unlocked position starting from the locked position via a partial area in such a way that the locking element is nonetheless completely framed in the recessed section 20 by the locking pawl 2 and the housing base body 5 together. The position fixation of the locking pawl 2 in the partial area occurs by self-locking.

The invention claimed is:

1. A floor lock for a motor vehicle seat for detachably connecting the motor vehicle seat to a vehicle floor, comprising:
    a locking pawl adjustable between a locked position and an unlocked position; and
    a control pawl, which fixes the position of the locking pawl, is in operative connection with the locking pawl and is adjustable relative to the locking pawl between a closed position and an open position,
    wherein the locked position of the locking pawl is secured by a securing pawl arranged in a secured position in which the securing pawl is in operative connection with the control pawl and is adjustable using the control pawl between the secured position and a release position,
    wherein the securing pawl is configured to move due to the operative connection existing via the control pawl in the direction of the secured position until a locking element is completely framed in a recessed section formed by the locking pawl,
    wherein the securing pawl is formed to engage with the locking pawl in the locked position to prevent the floor lock from opening,
    wherein the securing pawl is pretensioned in the direction of its release position and/or the locking pawl is pretensioned in the direction of its unlocked position.

2. The floor lock for a motor vehicle seat according to claim 1, wherein the control pawl is pretensioned in the direction of its closed position.

3. The floor lock for a motor vehicle seat according to claim 2, wherein the initial tension acting on the control pawl is greater than the initial tension acting on the securing pawl and/or locking pawl.

4. The floor lock for a motor vehicle seat according to claim 1, wherein the control pawl in its closed position touches surfaces of the securing pawl and the locking pawl facing each other.

5. The floor lock for a motor vehicle seat according to claim 4, wherein the touching surfaces of the control pawl and the securing pawl and/or the control pawl and the locking pawl in the closed position of the control pawl are formed in such a way that self-locking occurs between the touching surfaces, which inhibits independent displacement of the securing pawl in the direction of its release position and/or of the locking pawl in the direction of its unlocked position.

6. The floor lock for a motor vehicle seat according to claim 4, wherein the respective surfaces of the securing pawl and the locking pawl each move toward each other as the control pawl moves from the closed position to the open position.

7. The floor lock for a motor vehicle seat according to claim 1, wherein the control pawl in its open position is situated in such a way on the locking pawl arranged in the unlocked position and/or the securing pawl arranged in the release position that the locking pawl blocks against a displacement in the direction of its locked position and/or the securing pawl in the direction of its secured position.

8. The floor lock for a motor vehicle seat according to claim 1, wherein the locking pawl has an actuating element which can be brought into engagement with the locking element, the actuating element being situated in such a way that a movement of the locking pawl which is in the open position in the direction of the locking element causes a movement of the locking pawl in the direction of the closed position.

9. The floor lock for a motor vehicle seat according to claim 1, wherein the locking pawl encompasses the locking element situated in the locked position in a recess of a housing in such a way that the locking element is framed by the locking pawl and the housing together.

10. The floor lock for a motor vehicle seat according to claim 1, wherein the locking pawl is adjustable to compensate position tolerances with respect to the locking element from the locked position in the direction of the unlocked position via a partial area framing the locking element with the housing, with the contact areas of the locking pawl and the control pawl formed in such a way that independent displacement of the locking pawl from a position within the partial area in the direction of the unlocked position is blocked by self-locking.

11. The floor lock for a motor vehicle seat according to claim 1, wherein in the secured position the securing pawl at least partially encompasses the locking pawl on the outer side.

12. The floor lock for a motor vehicle seat according to claim 1, wherein contact surfaces of the locking pawl and securing pawl touching one another in a crash position are spaced apart in the locked position of the locking pawl.

13. The floor lock for a motor vehicle seat according to claim 1, further comprising a fastening clip attached to the control pawl, wherein a pull strap is attachable to the fastening clip to operate the floor lock.

14. The floor lock for a motor vehicle seat according to claim 1, wherein the locking pawl and the securing pawl are borne hinged on axes substantially parallel to each other and pivot in opposite directions as the control pawl moves between the closed position and the open position.

15. The floor lock of a motor vehicle seat according to claim 1, wherein movement of the control pawl between the closed position and the open position directly implements corresponding movements of the securing pawl and the locking pawl.

16. The floor lock of a motor vehicle seat according to claim 1, wherein the locking pawl includes a hook-shaped portion that is configured to engage with the locking element in the locked position, wherein the securing pawl at least partially encompasses an outer surface of the hook-shaped portion in the secured position.

\* \* \* \* \*